(12) United States Patent
Tominaga

(10) Patent No.: US 8,375,820 B2
(45) Date of Patent: Feb. 19, 2013

(54) HOLLOW ACTUATOR WITH BUILT-IN REDUCTION GEAR

(75) Inventor: Ryuuichirou Tominaga, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 333 days.

(21) Appl. No.: 12/818,151

(22) Filed: Jun. 18, 2010

(65) Prior Publication Data

US 2010/0319478 A1 Dec. 23, 2010

(30) Foreign Application Priority Data

Jun. 19, 2009 (JP) ................................. 2009-146951
Feb. 8, 2010 (JP) ................................. 2010-025895

(51) Int. Cl.
*H02K 7/10* (2006.01)
(52) U.S. Cl. .............. 74/421 A; 310/63; 310/77; 310/83
(58) Field of Classification Search ................. 74/421 A, 74/490.03; 310/75 R, 76, 77, 83, 63; 901/23, 901/25
See application file for complete search history.

(56) References Cited

U.S. PATENT DOCUMENTS

| | | | | |
|---|---|---|---|---|
| 3,285,638 | A * | 11/1966 | Folkerts | 403/344 |
| 5,161,290 | A * | 11/1992 | Hashimoto et al. | 29/40 |
| 5,714,810 | A * | 2/1998 | Yuhi et al. | 310/40 MM |
| 7,230,402 | B2 * | 6/2007 | Kumagai et al. | 318/568.11 |
| 7,915,773 | B2 * | 3/2011 | Takahashi | 310/88 |
| 8,067,869 | B2 * | 11/2011 | Tominaga et al. | 310/77 |
| 2010/0107814 | A1 | 5/2010 | Tominaga et al. | |

FOREIGN PATENT DOCUMENTS

| | | |
|---|---|---|
| JP | 2002-315261 | 10/2002 |
| JP | 2007-143255 | 6/2007 |
| WO | WO 2009/034817 | 3/2009 |

OTHER PUBLICATIONS

Chinese Office Action for corresponding CN Application No. 201010197026.1, Aug. 03, 2012.

* cited by examiner

*Primary Examiner* — William C Joyce
(74) *Attorney, Agent, or Firm* — Ditthavong Mori & Steiner, P.C.

(57) ABSTRACT

A hollow actuator with a built-in reduction gear includes a motor having an output shaft, and a reduction gear having an input shaft, the output shaft and the input shaft being provided separately from one another. The actuator also includes a motor section and a brake section disposed on a non-load side of the motor section. A bearing is attached to an inner periphery of the brake section. Another bearing that is different from the bearing provided on the inner periphery of the brake section rotatably supports the output shaft of the motor section.

8 Claims, 3 Drawing Sheets

HOLLOW ACTUATOR WITH BUILT-IN REDUCTION GEAR

CROSS-REFERENCE TO RELATED APPLICATION

The present application claims priority under 35 U.S.C. §119 to Japanese Patent Application No. 2009-146951 filed Jun. 19, 2009 and Japanese Patent Application No. 2010-025895 filed February 8. The contents of the application are incorporated herein by reference in their entirety.

BACKGROUND OF THE INVENTION

1. Field of the Invention

The present invention relates to a hollow actuator with a built-in reduction gear.

2. Description of the Related Art

As disclosed in Japanese Unexamined Patent Application Publication No. 2002-315261, in a hollow actuator with a built-in reduction gear, a motor hollow shaft is attached while penetrating through the inside of a hollow reduction gear, and an open portion of the reduction gear is sealed with oil seals to isolate the open portion from the outside.

SUMMARY OF THE INVENTION

According to one aspect of the present invention, a hollow actuator with a built-in reduction gear includes a motor section including an output shaft; a reduction gear section including an input shaft provided separately from the output shaft of the motor section; a brake section disposed on a non-load side of the motor section; a rotational position detection section; a hollow shaft that transmits rotation; a bearing on an inner periphery of the brake section; and at least another bearing configured to rotatably support the output shaft of the motor section, the bearing being different from the bearing on the inner periphery of the brake section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
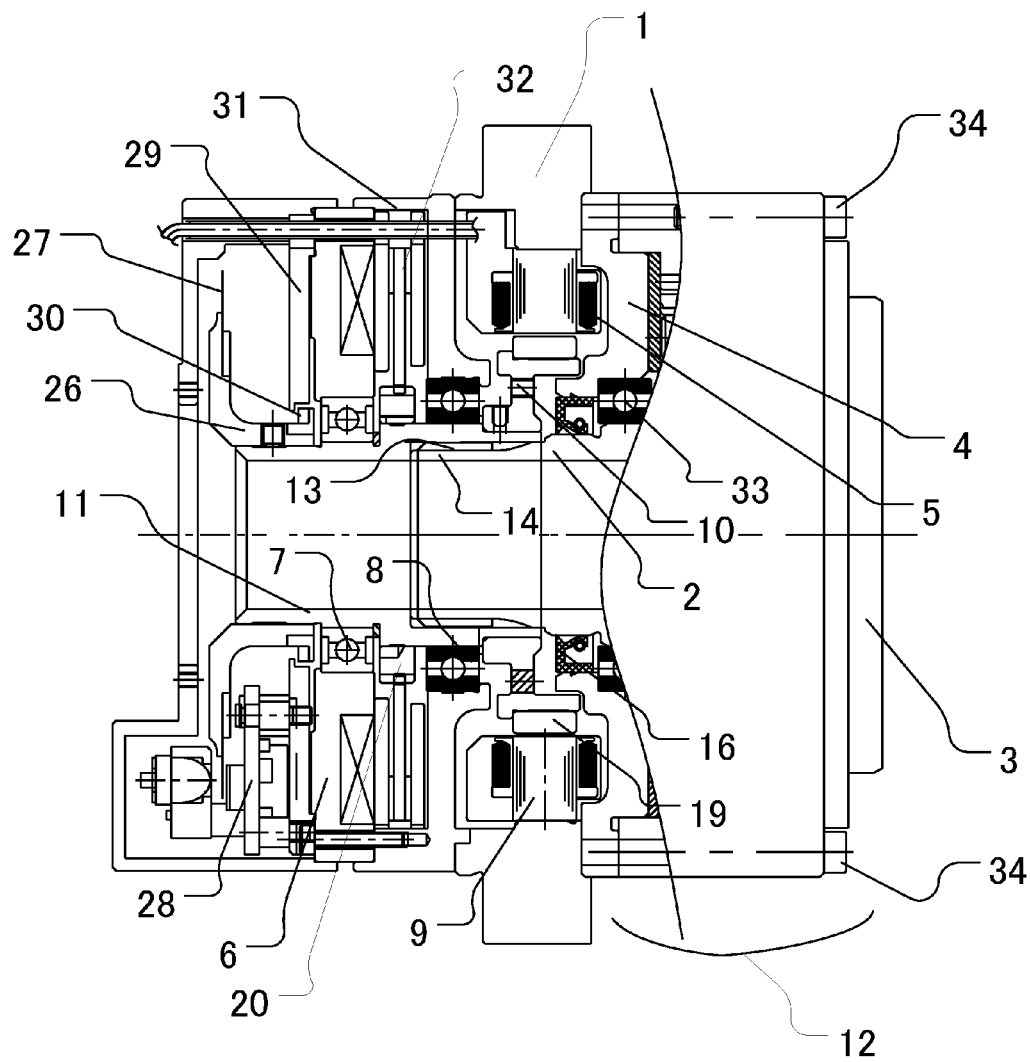
FIG. 1 is a sectional side view of a hollow actuator with a built-in reduction gear according to a first embodiment.

Embodiments will now be described with reference to the accompanying drawings, wherein like reference numerals designate corresponding or identical elements throughout the various drawings.

First Embodiment

FIG. 1 is a sectional side view of a hollow actuator with a built-in reduction gear according to a first embodiment.

A motor yoke 10, a second bearing 8, a brake hub 20, a first bearing 7, and an encoder hub 26 are attached to the outer periphery of a motor output shaft 11, in order from the side of a reduction gear 12. A permanent magnet 19 is secured to the outer periphery of the motor yoke 10. A motor core 9 is arranged around the outer periphery of the permanent magnet 19 with a gap interposed therebetween. The outer periphery of the motor core 9 is fixed to the inner periphery of a frame 1 by an adhesive or the like. The motor core 9 has a coil groove (not shown). A coil is provided in the coil groove so that the coil has a predetermined magnetic pole. The coil has coil ends 5 respectively extending to both sides in the axial direction of the motor core 9, that is, to the reduction gear side and the encoder side of the motor core 9. A brake frame 31 is fixed to an end surface on the encode side of the frame 1 by a screw (not shown). Thus, the brake frame 31 is integrally provided with the frame 1. The second bearing 8 is secured to the inner periphery of the brake frame 31. A brake 6 is fixed to the brake frame 31 by a screw. The brake hub 20 and a brake disk 32 are attached by a spline (not shown) slidably in the axial direction and synchronously rotatably in the circumferential direction. When the brake disk 32 is in a release state, the brake disk 32 is rotated with the motor output shaft 11. When the brake disk 32 is in a restraint state, the brake disk 32 is restrained with a predetermined brake torque to inhibit the motor output shaft 11 from being rotated. The first bearing 7 is secured to the inner periphery of the brake 6. The inner periphery of the first bearing 7 and the inner periphery of the second bearing 8 are secured to the outer periphery of the motor output shaft 11. The motor output shaft 11 is rotatably supported by both bearings. An encoder substrate clamping plate 29 is fixed to the encode side of the brake 6 by a screw (not shown). An encoder substrate 28 is fixed to the encoder substrate clamping plate 29 by a screw. A dustproof mechanism 30, which may be an oil seal etc., is provided between the inner periphery side of the encoder substrate clamping plate 29 and the motor output shaft 11. The dustproof mechanism 30 prevents dust such as wear debris from the brake 6 from entering the inside of the encoder. An encoder disk 27 is bonded and fixed to the encoder hub 26. A motor toothed portion 13 is provided in a portion on the reduction gear side of the inner periphery of the motor output shaft 11. An input gear 14 is provided on a portion on the motor side of the outer periphery of a reduction gear input shaft 2. The input gear 14 can mesh with the motor toothed portion 13. When the motor output shaft 11 is rotated, the input gear 14 is rotated synchronously with the motor output shaft 11 while being coupled thereto. The motor toothed portion 13 has a tapered shape such that the diameter of the shaft is decreased in the axial direction. Also, the input gear 14 has a tapered shape that is tapered toward a tip end thereof and hence can mesh with the motor toothed portion 13. The input gear 14 is coupled to the motor toothed portion 13 and is rotated. The reduction gear 12 includes a reduction gear mechanism (not shown). The reduction gear mechanism causes a power, with a speed reduced (or increased) to attain a predetermined reduction gear ratio, to be output through a reduction gear output shaft 3. Grease for lubricating the reduction gear mechanism is sealed in the reduction gear 12. To prevent the grease from leaking to the outside of the reduction gear 12, an oil seal 16 is provided for the reduction gear input shaft 2. The oil seal 16 and a reduction gear opposite-L-shaped bearing 33 that supports the oil seal 16 and the reduction gear input shaft 2 are attached to the inner periphery of a reduction gear flange 4. Since the oil seal 16 and the reduction gear opposite-L-shaped bearing 33 are attached side by side in the axial direction, the shape of the reduction gear flange 4 is a disk-like shape, the inner periphery of which overhangs the motor core 9. The disk-like portion of the reduction gear flange 4 has a width that is determined on the basis of the intensity required for holding the reduction gear mechanism. The required width in view of the intensity is smaller than an installation width of the oil seal 16 and the reduction gear opposite-L-shaped bearing 33. Hence, a non-required portion can be removed. Since the removed portion has a shape that allows the coil ends 5 to be fitted, the axial dimension of the motor with the built-in hollow reduction gear can be decreased. Also, since the bearing of the motor is disposed on the inner periphery of the brake, the unused space can be decreased, and the axial dimension can be further decreased.

Since the reduction gear is coupled to the motor by inserting a predetermined number of attachment bolts 34 into holes in the reduction gear, and securing with screws to a tap (not shown) provided on the frame 1. Hence, the reduction gear 12 can be easily attached and easily removed.

Second Embodiment

Figure 2:
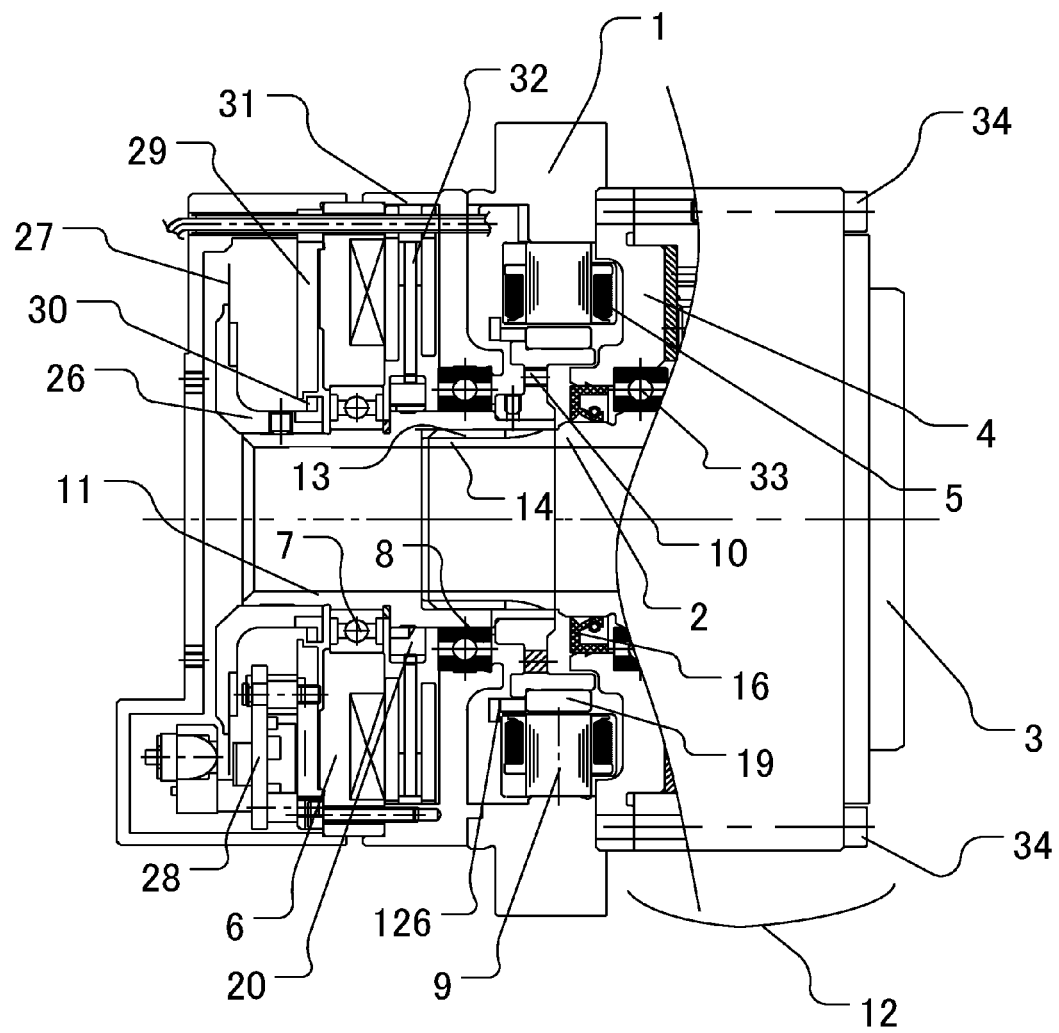
FIG. 2 is a sectional side view of a hollow actuator with a built-in reduction gear according to a second embodiment.

A second embodiment will be described with reference to FIG. 2. The description of the components similar to those in the first embodiment will be omitted.

Figure 3A:
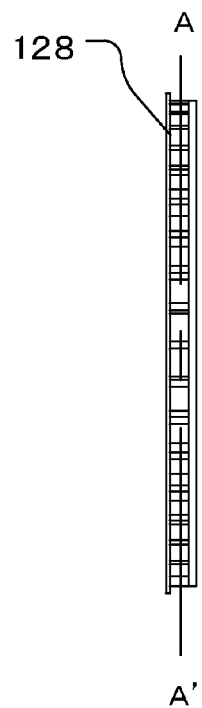
FIG. 3A is a side view of a fan structure.
Figure 3B:
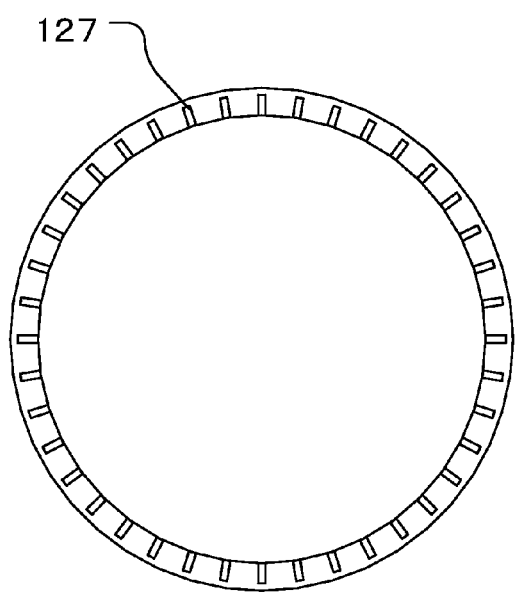
FIG. 3B is a sectional view of the fan structure taken along line A-A.

A fan 126 is attached on the brake side of the outer periphery of the motor yoke 10. FIGS. 3A and 3B show the structure of the fan 126. The fan 126 includes a disk 128 and a plurality of fins 127. The fins 127 are provided on the disk 128 radially at positions at a regular interval along the circumference of the disk 128. Referring to FIG. 2, the outer periphery side of the fins 127 is arranged around an inner peripheral surface portion of the coil end 5 on the non-load side with a very small gap interposed therebetween. The disk 128 overhangs the end surface of the coil end 5 on the non-load side.

Next, the operation will be described. When the motor yoke 10 driven by the motor is rotated, the fan 126 fixed to the motor yoke 10 is also rotated. When the fan 126 is rotated, the air around the fins 127 flows in the circumferential direction of the fins 127 accordingly. The air flow that has reached the outer periphery of the fins 127 is inhibited from flowing to the non-load side by the disk 128. Thus, the air passes through the gap between the motor yoke 10 and the motor core 9, and flows to the load side (the reduction-gear side). Since the oil seal 16 is attached at the load side, the pressure on the motor side of the fan 126 is increased because of the rotation of the fan 126. Consequently, vaporization in which the grease that is vaporized in the reduction gear leaks from the oil seal 16 can be prevented from occurring.

Also, the air around the fan 126 is stirred, and hence heat generated at the coil end 5 is transmitted to peripheral parts such as the brake. Increase in temperature of the motor can be decreased. Further, the fins 127 are arranged in the unused space at the inner periphery of the coil end 5. Thus, the hollow actuator with the built-in reduction gear can be decreased in size.

obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A hollow actuator with a built-in reduction gear, comprising:
   a motor section including an output shaft;
   a reduction gear section including an input shaft provided separately from the output shaft of the motor section;
   a brake section disposed on a non-load side of the motor section;
   a rotational position detection section;
   a hollow shaft that transmits rotation;
   a bearing on an inner periphery of the brake section; and
   at least another bearing configured to rotatably support the output shaft of the motor section, the bearing being different from the bearing on the inner periphery of the brake section,
   wherein the reduction gear section includes a flange adjacent to the motor section, the flange including a recessed portion,
   wherein the motor section includes a coil disposed in the recessed portion of the flange of the reduction gear section, and
   wherein every bearing that supports the output shaft of the motor section is disposed on the non-load side of the motor section.

2. The hollow actuator with the built-in reduction gear according to claim 1, wherein the output shaft of the motor section is coupled to the input shaft of the reduction gear section by a spline.

3. The hollow actuator with the built-in reduction gear according to claim 1, wherein the flange has a disk-like shape, and wherein the flange overhangs the core in an axial direction of the input shaft.

4. The hollow actuator with the built-in reduction gear according to claim 1,
   wherein the output shaft of the motor section has a toothed inner peripheral surface,
   wherein the input shaft of the reduction gear section has a toothed outer peripheral surface to mesh with the toothed inner peripheral surface of the output shaft of the motor section, and
   wherein the inner peripheral surface of the output shaft is coupled to the outer peripheral surface of the input shaft.

5. The hollow actuator with the built-in reduction gear according to claim 4,
   wherein the input shaft has a tapered shape that is tapered toward a tip end of the input shaft, and
   wherein the output shaft has a tapered shape to mesh with the input shaft.

6. The hollow actuator with the built-in reduction gear according to claim 1, further comprising:
   a fan,
   wherein the motor section includes a motor yoke and the fan is disposed at an end surface on the non-load side of the motor yoke.

7. The hollow actuator with the built-in reduction gear according to claim 6,
   wherein the coil has a coil end having an end surface, and
   wherein the fan includes
      fins disposed on a circumference with a gap interposed between the fins and the coil end, and
      a disk overhanging the end surface of the coil end.

8. The hollow actuator with the built-in reduction gear according to claim 1, wherein the flange is disk-shaped, and wherein the recessed portion is recessed in an axial direction of the input shaft.

* * * * *